United States Patent

Stannow et al.

[11] 3,937,598
[45] Feb. 10, 1976

[54] ENCASED REFRIGERATING MACHINE

[75] Inventors: Jorgen Stannow, Sonderborg; Kjeld Kjeldsen, Nordborg; Bent Karll; Ole Joker Nissen, both of Augustenborg, all of Denmark

[73] Assignee: Danfoss A/S, Nordborg, Denmark

[22] Filed: Oct. 30, 1974

[21] Appl. No.: 519,353

[30] Foreign Application Priority Data
Nov. 2, 1973 Germany............................ 2354897

[52] U.S. Cl. ............................................. 417/363
[51] Int. Cl.² ........................................ F16F 15/00
[58] Field of Search ........... 248/20; 220/69; 62/296; 417/312, 313, 363

[56] References Cited
UNITED STATES PATENTS

| | | | |
|---|---|---|---|
| 1,014,054 | 1/1912 | Forchheimer.......................... | 220/69 |
| 2,874,865 | 2/1959 | Canty et al. ........................... | 248/20 X |
| 2,920,460 | 1/1960 | Atchison................................ | 62/296 |
| 2,978,213 | 4/1961 | Kass....................................... | 248/20 |
| 3,144,754 | 8/1964 | Tilden................................... | 62/296 X |
| 3,215,343 | 11/1962 | Gannaway............................ | 417/363 |

Primary Examiner—Henry T. Klinksiek

[57] ABSTRACT

The invention relates to refrigeration apparatus of the type having a casing which contains an electric motor and reciprocating compressor means. This type of apparatus is subject to creating undesirable vibrations and noises, the reduction of which is the object of the invention. This is done by adding additional mass to the casing which is equal to fifty per cent or more of the mass of the casing. The correspondingly greater mass inertia has the effect of causing the casing to absorb vibrations emanating from the interior of the casing to a lesser extent than before.

15 Claims, 3 Drawing Figures

ENCASED REFRIGERATING MACHINE

The invention relates to an encased refrigerating machine for incorporation in cold-storage cabinets or the like.

A refrigerating machine produces vibrations, which are caused for example by the reciprocating compressor piston and the moment of rotation occurring during switching on and off. In addition, the refrigerating machine produces noise which is caused by the operation of the valves, the movements of the liquid and gaseous refrigerants and the like. In order to limit, as far as possible, the transfer of these troublesome vibrations and oscillations to the case, the refrigerating machine is mounted on the case by springs. The pressure pipe leading outwards from the pressure chamber through the wall of the case is also of resilient construction. Sometimes steps are also taken to prevent transfer through the oil sump. Despite every effort, such vibrational movements have been imparted to the case that a noise level of between 35 and 45 dB(A) depending upon the type of machine has resulted.

As used herein the term dB means decibel and (A) refers to a normal filter. Ns/m means Newton second/meter. Point impedance is a mechanical ohm.

The object of the invention is to provide an encased refrigerating machine in which the vibrations of the case and, as far as possible, the noise which it propagates are considerably reduced.

According to the invention, this object is achieved in that an additional mass, which is greater than 50%, preferably 100 – 300%, of the total mass of the case is firmly attached to the exterior of the case.

A particularly advantageous value for the additional mass is one that is approximately equal to or is greater than the mass of a case consisting of a normal 3 mm-thick metal sheet.

In this way, the mass of that part in which the refrigerating machine is spring-mounted, is artificially increased. The correspondingly greater mass inertia has the effect of causing the case to absorb vibrations emanating from the refrigerating machine to a considerably lesser extent than heretofore.

Expediently, at least 40% of the additional mass is disposed outside the wall of the case that extends parallel to the motor crankshaft. This results in an extremely high moment of inertia which very considerably reduces the effects, on the case of the starting and stopping of the refrigerating machine.

In a first form of construction, the additional mass is fitted as a base on the bottom of the case. This base can be used as a stand surface. The entire surface of the case still remains available for the purpose of achieving unrestricted heat-exchange.

In a preferred further form of construction, the additional mass partly or completely surrounds the case in the form of a layer. In this arrangement the vibration-reducing mass performs the further function of reducing the noise propagated by the case. Particularly good results are obtained if the surrounding layer encompasses the case in a substantially uniform manner.

Preferably, the material selected for the additional mass is such that it has a greater internal damping effect than steel. This damping effect, which results inter alia from molecular friction, causes sound energy to be dissipated on the way from the inner surface of the case to the outer surface of the additional mass. Here, at all places where it is provided with the surrounding layer, the case may have a mechanical point-impedance of at least 200 Ns/m.

The surrounding layer has the effect of increasing the surface available for heat-exchange with the surrounding air. Consequently, satisfactory dissipation of heat from the case is ensured even when the thermal conductivity of the additional mass is lower than that of steel. For practical purposes, it is simply necessary to ensure that the coefficient of thermal conductivity is greater than 0.5 kcal/mh°C. Values of 1.0–1.5 kcal/mh°C represent a preferred range.

In this connection, it has also to be taken into account that the additional mass possesses a certain heat-storage capacity. This means that, specifically during the generally intermittent operation of a refrigerating machine, heat is stored in the additional mass during the periods of high thermal load, i.e. when the machine is running, and heat is dissipated outwardly during the non-operating period. Consequently the peak temperature of the refrigerating machine is low since the additional mass is able to absorb the peaks. An additional mass having a specific heat of more than 0.15, preferably approximately 0.2 kcal/kg°C has proved advantageous.

When all the requirements regarding an optimum mass, optimum sound-absorption and optimum thermal behaviour are considered, surrounding layers having a thickness of 0.5 – 4.5, preferably approximately 2.0 cm, have proved advantageous.

The surrounding layer may also take over part of the load applied to the case, so that the sheet-metal of the case may have a reduced thickness of 2.5 mm and preferably 2.0 mm or less. In the extreme case the surrounding layer may completely take over the function of the case as a pressure container.

Particular advantage is achieved if the additional mass consists mainly of a non-metallic mineral substance. Mineral substances are cheap and can generally be easily processed. They can be firmly connected to the case for example by being cast around it or bonded to it in such manner that a good molecular union between the additional mass and the case is created. To a very large extent these materials also possess the properties called for above. Examples of such substances are glass, gypsum, stone, ceramics and the like.

In accordance with a preferred embodiment, the additional mass consists mainly of concrete. Expediently, this concrete should have a stone additive having a particle-size up to 8 mm. This material is extremely cheap and can be readily shaped before it sets.

It is also advantageous if the surrounding layer contains a reinforcement. This reinforcement can increase the compressive strength. If the reinforcement consists of metal filaments or wires it also raises the coefficient of thermal conductivity of the additional mass.

The simplest procedure is for the surrounding layer to be cast or sprayed around the case. In such procedure, the surrounding layer may be encompassed by a thin wall of sheet-metal acting as a mould. This wall of sheet-metal renders it unnecessary to apply a further separate treatment to the exterior of the additional mass for the purpose of improving its appearance.

In a further arrangement, the surrounding layer may be made up of several parts, prefabricated and firmly connected to the case by bonding or the like. The refrigerating machine provided with the additional mass is relatively heavy, whereas the present tendency is towards a progressive reduction of the weight of cold-storage cabinets. Therefore, in accordance with a further feature of the invention, there is provided a stand surface for supporting the refrigerating machine on the floor. The weight of the refrigerating machine is thus applied directly to the floor and not by any way of the cold-storage cabinet. In this connection, vibration-absorbing means may be provided between the stand surface and the floor.

The arrangement may be such that the case can be moved in the vertical direction in a compartment of the cold-storage cabinet or the like that is open at the bottom.

During transportation the case must of course be firmly connected to the cold-storage cabinet. This can be done for example by connecting the case to the cold-storage cabinet or the like by means of a releasable securing means. After the cold-storage cabinet has been installed the securing means used during transportation is released and the case is set on the floor.

A further possible arrangement consists in connecting the case to the cold-storage cabinet or the like by means of fastening elements. These fastening elements permit the case to hang down below the stand surface of the cold-storage cabinet during transportation. However the case rests on the floor when the cold-storage cabinet is set down.

The invention will now be described in greater detail by reference to the embodiments illustrated in the attached drawings, in which.

Figure 1:
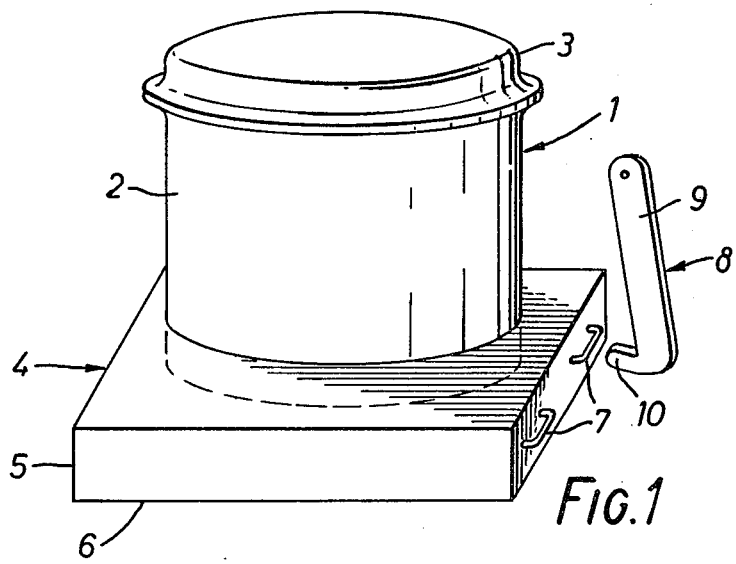
FIG. 1 is a perspective view of a first embodiment.

In the embodiment shown in FIG. 1, a normal case 1 of a refrigerating machine comprises a body 2 and a cover 3. The various electrical connections, the suction pipe and the pressure pipe are omitted in order to keep the drawing simple. It is assumed that the refrigerating machine has a vertically disposed motor crankshaft.

An additional mass 4 in the form of a base 5 is provided at the bottom of the case 1. It will be readily seen that the important parts of the additional mass are disposed outwardly of the diameter of the case. The base 5 has a stand surface 6 whereby it rests directly upon the floor or preferably with virbration-absorbing means disposed between it and the floor.

On the lateral faces of the base 5 are fitted looped elements 7 below each of which engages a releasable fastening means 8 for use during transportation; said means here takes the form of a pivotable lever 9 which is attached to the cold-storage cabinet and has a hook 10 at its lower end. Only one of the four levers that are provided is illustrated.

Figure 2:
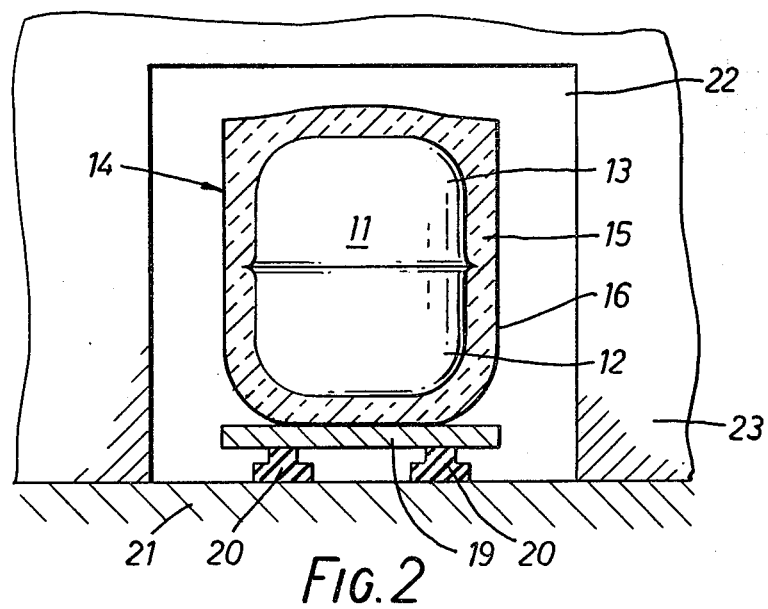
FIG. 2 is a longitudinal section through a second embodiment in the installed condition.
Figure 3:
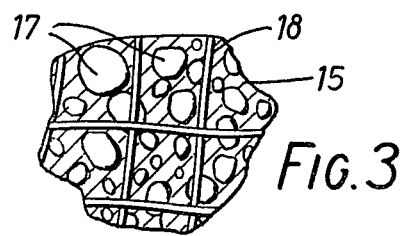
FIG. 3 is an illustration of the additional mass in section and on an enlarged scale.

In the embodiment shown in FIG. 2, a case 11 of somewhat different shape and comprising a lower part 12 and an upper part 13 is provided with an additional mass 14 which completely encompasses the case as a surrounding layer 15, though it is not always necessary for the case to be fully enclosed in the cast material. The surrounding layer is in turn surrounded by a thin sheet-metal wall 16 which acts as a mould for the concrete. In this embodiment, quick-setting cement is used for making the concrete. A stone additive consists of a mixture of stones 17, the particle-size of which does not exceed 8 mm. Also incorporated in the concrete is a metal reinforcement 18 which consists of wires, and increases the strength and thermal conductivity of the surrounding layer 15. Metal filaments may be used instead of the wires.

Associated with the case is a stand surface 19 whereby the case can be supported on the floor 21 with vibration-absorbing means 20 made of rubber or the like interposed between the case and the floor. The case is disposed in a compartment 22 of the housing 23 of the cold-storage cabinet, which compartment is open at the bottom.

In one arrangement used, the surrounding layer 15 had a thickness of 20 mm on that side presented to the compressor. The wall-thickness of the case 11 was reduced to 2.5 mm. With a diameter of case of 180 mm in the horizontal direction, this resulted in a surface increase of approximately 25%. The additional mass was approximately 125% of the mass of the case. The coefficient of thermal conductivity of the concrete was 1.4 kcal/mh°C, and the specific heat was 0.21 kcal/kg°C. Approximately 60% of the additional mass was disposed outwardly of the diameter of the case. The mechanical point impedance was at least approximately 500 Ns/m in the frequency range 500–5000 Hz. In this way the noise level was reduced from 39 to 29 dB(A). The peak temperature of the case during normal intermittent operation dropped by 5°C. The case can therefore be used with greater efficiency than previously.

Instead of the sheet-metal wall 16, the surrounding layer can be provided with some other outer skin, for example a covering of lacquer as was used in the present example.

We claim:

1. A refrigerating machine of the type having a casing for containing an electric motor and reciprocating compressor means, comprising a completely closed sheet metal casing, mass means in the form of a layer bonded to and substantially surrounding the exterior of said casing, said mass means being at least one-half as heavy as said casing.

2. A refrigerating machine according to claim 1, wherein said casing is 3 mm thick sheet metal, said mass means being approximately equal in weight to the mass of said casing.

3. A refrigerating machine according to claim 1 wherein said mass means has a greater internal damping effect than steel.

4. A refrigerating machine according to claim 1 wherein said casing has a mechanical point impedance of at least 200 Ns/m at all places where it is surrounded by said layer.

5. A refrigerating machine according to claim 1 wherein said mass means has a coefficient of thermal conductivity of more than 0.5 kcal/mh°C.

6. A refrigerating machine according to claim 1 wherein said mass means has a specific heat of more than 0.15 kcal/kg°C.

7. A refrigerating machine according to claim 1 wherein said layer has a thickness of 0.5 – 4.5 cm.

8. A refrigerating machine according to claim 1 wherein said surrounding layer takes up part of the pressure applied to said casing and the sheet metal of said casing has a thickness of less than 2.5 mm.

9. A refrigerating machine according to claim 1 wherein said mass means comprises mainly a nonmetallic mineral substance.

10. A refrigerating machine according to claim 9 wherein said nonmetallic mineral substance consists mainly of concrete.

11. A refrigerating machine according to claim 10 wherein said concrete has a stone additive having a particle size of up to 8 mm.

12. A refrigerating machine according to claim 1 wherein said surrounding layer contains a reinforcement.

13. A refrigerating machine according to claim 12 wherein said reinforcement consists of metal wires.

14. A refrigerating machine according to claim 1 wherein said surrounding layer is cast on said casing.

15. A refrigerating machine according to claim 14 wherein said surrounding layer is encompassed by a thin sheet metal wall having the form of a mold.

* * * * *